United States Patent
Cohen (10) Patent No.: US 7,461,972 B2
(45) Date of Patent: Dec. 9, 2008

(54) ONE POINT CALIBRATION INTEGRATED TEMPERATURE SENSOR FOR WIRELESS RADIO FREQUENCY APPLICATIONS

(75) Inventor: Marc Harry Cohen, Silver Spring, MD (US)

(73) Assignee: Altivera L.L.C., Williamsburg, VA (US)

( * ) Notice: Subject to any disclaimer, the term of this patent is extended or adjusted under 35 U.S.C. 154(b) by 118 days.

(21) Appl. No.: 11/347,088

(22) Filed: Feb. 3, 2006

(65) Prior Publication Data

US 2006/0202821 A1   Sep. 14, 2006

Related U.S. Application Data

(60) Provisional application No. 60/651,007, filed on Feb. 8, 2005.

(51) Int. Cl.
G01K 7/25 (2006.01)
G01K 15/00 (2006.01)
A61B 5/01 (2006.01)
G08C 19/00 (2006.01)

(52) U.S. Cl. ............ 374/100; 374/172; 374/1; 374/163; 374/183; 340/870.17; 702/99; 702/139; 600/549; 327/513

(58) Field of Classification Search ............ 374/1, 374/2, 100, 163, 170–174, 183, 185, 179, 374/117–119; 600/549, 474; 327/512, 513; 702/130, 133, 136, 139, 99; 340/870.17, 340/572.7
See application file for complete search history.

(56) References Cited

U.S. PATENT DOCUMENTS 3,564,420 A * 2/1971 Ewen et al. ............ 374/122
3,878,723 A * 4/1975 Blalock et al. ............ 374/175
5,844,862 A * 12/1998 Cocatre-Zilgien ............ 368/10
6,862,550 B1 * 3/2005 Cook ............ 702/136
6,970,518 B2 * 11/2005 Kuffner et al. ............ 375/259
7,149,246 B1 * 12/2006 Adams et al. ............ 375/238
7,154,396 B2 * 12/2006 Reunamaki ............ 340/572.4
7,180,211 B2 * 2/2007 Sinha et al. ............ 307/651
7,197,420 B2 * 3/2007 Johns et al. ............ 702/130
7,251,230 B2 * 7/2007 Masui et al. ............ 370/335
2002/0016553 A1 * 2/2002 Tamaki et al. ............ 600/549
2002/0115920 A1 * 8/2002 Rich et al. ............ 600/345
2004/0062294 A1 * 4/2004 Clemens et al. ............ 374/185
2004/0122315 A1 * 6/2004 Krill ............ 600/437
2005/0046567 A1 * 3/2005 Mortenson et al. ...... 340/539.13
2005/0070811 A1 * 3/2005 Crowley ............ 600/549
2005/0169345 A1 * 8/2005 Urbas et al. ............ 374/100

(Continued)

FOREIGN PATENT DOCUMENTS

WO   WO 9953279 A1 * 10/1999

Primary Examiner—Gail Verbitsky
(74) Attorney, Agent, or Firm—Dickinson Wright, PLLC (57) ABSTRACT

A low power analog linear temperature sensor integrateable with digital and/or analog circuits in CMOS fabrication processes. The sensor is accurately calibrateable at a single temperature that yields a linear relationship between measured differential voltage and temperature over a wide variety of temperature ranges. The sensor provides stable voltage and current references that are essential for wireless sensor platforms. There are many applications where sensors require stable voltage/current references and the physics of the sensor's transduction mechanisms are themselves temperature dependent. Wireless platforms such as, but not limited to, passive RFID tags with the addition of on- or off-chip sensors provide a low cost solution for a variety of low cost sensor applications.

2 Claims, 9 Drawing Sheets

U.S. PATENT DOCUMENTS

| | | | |
|---|---|---|---|
| 2005/0174236 A1* | 8/2005 | Brookner | 340/539.26 |
| 2006/0006987 A1* | 1/2006 | Hashimoto et al. | 340/10.51 |
| 2006/0178567 A1* | 8/2006 | Goh et al. | 600/300 |
| 2006/0281975 A1* | 12/2006 | Yang | 600/300 |
| 2006/0290496 A1* | 12/2006 | Peeters | 340/572.1 |
| 2007/0057771 A1* | 3/2007 | Tomioka | 340/10.1 |
| 2007/0062299 A1* | 3/2007 | Mian et al. | 73/763 |
| 2007/0140308 A1* | 6/2007 | Hsu et al. | 374/1 |
| 2007/0191692 A1* | 8/2007 | Hsu et al. | 600/301 |
| 2008/0018480 A1* | 1/2008 | Sham | 340/573.1 |

* cited by examiner

ONE POINT CALIBRATION INTEGRATED TEMPERATURE SENSOR FOR WIRELESS RADIO FREQUENCY APPLICATIONS

CROSS REFERENCE TO RELATED APPLICATIONS

This application claims priority to U.S. Provisional Application No. 60/651,007, entitled "One Point Calibration Integrated Temperature Sensor for Wireless Radio Frequency Applications", filed on Feb. 8, 2005.

FIELD OF THE INVENTION

The present invention relates to a novel low power, single calibration point analog linear temperature sensor that can be integrated with digital and/or analog microelectronic circuits and be used for specialized applications such as passive RFID sensor tags.

BACKGROUND OF THE INVENTION

Temperature sensing provides vital information about the condition, safety and state of health of items and individuals, for example, in the supply chain of perishables, foods, pharmaceuticals and other temperature sensitive goods, for medical observation and medical diagnostics as well as for homeland security.

The novel one point calibration integrated temperature sensor described herein is intended for integration into low cost wireless transceiver platforms such as, but not limited to, passive Radio Frequency Identification (RFID) transceiver chips, where very little additional power consumption is available for on-chip or off-chip sensors. The invention thereby facilitates the transformation of passive RFID tags into low cost platforms that can be used for a variety of different sensing applications.

In many state of the art consumer, commercial and medical microelectronic applications, where the minimization of power consumption is of primary concern, analog circuits can be designed, by those skilled in the art, to consume considerably less power than digital circuits that perform the same or similar function.

Several analog integrated temperature sensors have been proposed. Typically, these circuits are referred to as PTAT (proportional to absolute temperature) or CTAT (complimentary to absolute temperature) and are frequently utilized in band gap voltage references where their inherent nonlinear temperature dependence is undesirable because it requires more than a one point temperature calibration to map the sensor's nonlinear output response to an accurate temperature reading. This requires a look-up table that must reside in memory either on the wireless transceiver sensor chip itself or in the wireless transceiver sensor chip reader. Moreover, additional circuitry, surface area and power consumption are required to startup PTAT and CTAT circuits as well as to attempt to nullify second and higher order nonlinearities.

SUMMARY OF THE INVENTION

In an embodiment described herein, a one point calibration, linear temperature sensor is specifically designed to be analog in nature so as to consume minute amounts of power when switched on, and no power when switched off. The temperature sensing circuitry therefore always stays in thermal equilibrium with the surface to which it is attached. When a passive RFID tag is powered by a Radio Frequency (RF) signal transmitted by an RFID tag reader, the tag circuitry turns on and supplies power to the wireless transceiver sensor chip including the temperature sensor. The passive transceiver then uses this power to rebroadcast or reflect back its data to the reader. In order to maximize its read range, the total power consumed by any sensor circuitry must be minimal when compared with power consumed by the wireless transceiver circuitry itself. The low power one point calibration analog linear integrated temperature sensor circuitry is specifically designed to draw minimal amounts of current at low power supply voltages typical in state of the art passive RFID technology.

The sensor is designed to measure temperatures over an industrial range, $T_{industrial}=-10°$ C. to $100°$ C. and over a medical range, $T_{medical}=34°$ C. to $42°$ C.

The additional cost of integrating the low power, linear, one point calibration analog integrated temperature sensor together with the wireless transceiver will be low since the temperature sensing elements and associated circuit components are themselves inherently part of the same Integrated Circuit (IC) fabrication technology, and take up minimal additional chip surface area. This integrated on-chip solution eliminates costs which would otherwise be associated with using an external temperature sensor, requiring additional bonding pads on the IC and attaching and mounting the external temperature sensing device to the transceiver chip, followed by sensor calibration.

Furthermore, the described embodiment of the linear one point calibration analog temperature sensor can be fabricated in a generic CMOS digital integrated circuit technology. No additional specialized layers are necessary. If non-standard fabrication technologies are required by the wireless transceiver chip itself, the described embodiment of the linear one point calibration analog integrated temperature sensor permits the use of any additional fabrication technology layers that may enhance its performance in terms of temperature range, accuracy or power consumption.

In the embodiment described herein, a linear relationship between actual temperature and measured differential voltages (currents) is theoretically predicted by the very nature of the device physics of the temperature sensing elements themselves, their minimal power consumption and their circuit topology.

In the described embodiment, only a single temperature calibration point is sufficient to establish the functional linear relationship between measured differential voltages (currents) and temperature. The fundamental device physics of the chosen integrated sensing elements and associated integrated circuit topology dictate that, at absolute zero temperature ($-273.15°$ C.), the sensor will produce an output of zero volts (fixed current). Therefore, in a linear function that relates temperature to measured output differential voltage, the only unknown parameter is the slope. The value of the intercept is known and equal to absolute zero temperature, $-273.15°$ C. Therefore, only one calibration temperature must be established while the analog integrated temperature sensor's output voltages are measured in order to calculate the slope parameter—hence a one-point temperature calibration.

In another related embodiment, those skilled in the art of analog IC design can utilize the linear one point calibration analog temperature sensor described herein, to provide ultra-stable, temperature independent voltage and current references necessary for either on-chip circuitry such as analog to digital data converters (ADC) or for any external sensors that could be connected to the sensor chip, but are mounted off-chip. Stable voltage and/or current references are essential for the operation of many different kinds of sensors such as, but not limited to, those that transduce changes in conductance, capacitance, inductance or frequency as a result of changes in a physical variable.

In the present embodiment, an ADC would be required to convert analog sensor voltages into digital format for local storage followed by on-demand rebroadcast to a wireless sensor tag reader.

In another related embodiment, where multiple analog sensors are either integrated into the transceiver chip itself or externally connected to the transceiver chip, an analog multiplexer and an analog sample and hold circuit (S/H) would also be required. The combination of an ADC, analog multiplexer, analog S/H and ultra-stable voltage and/or current references makes a low cost wireless sensor platform feasible and attractive in a wide variety of applications.

Knowledge of the temperature is also essential when other sensors' calibrations and accuracies themselves depend upon temperature.

In the present embodiment, it is the condition and safety of an object to which the wireless transceiver sensor chip is attached, that is of primary interest. For example, in the supply chain of perishables, pharmaceuticals, foods and other temperature sensitive goods, for medical observation and medical diagnostics as well as for homeland security, it is the temperature history associated with each of these items that informs us of their condition, health and safety.

In another related embodiment, it is the environment in which the objects with the attached wireless transceiver sensor chip are placed that yields additional information of interest and value. For example, a wireless transceiver sensor chip reader placed in a warehouse can measure the temperature of the warehouse in which the objects with attached wireless transceiver sensor chip might be temporarily stored. An individual experiencing a fever who is wearing a passive diagnostics skin patch sensor that includes a wireless transceiver, and who is exercising or working in a hot environment, can read their immediate surrounding environmental temperature using, for example, a cell phone also equipped with a temperature sensor.

An embodiment that uses the combination of [0017] and [0018] is referred to as "dual use" and its objective is to yield more precise wireless transceiver sensor chip measurements. For example, in measurements of surface temperatures of objects or individuals, knowledge of the temperature of the environment in which the objects or individuals are placed can, in addition to the objects' or individuals' surface temperatures, yield more precise measurements of the objects' or individuals' internal and/or surface temperatures.

The "dual use" embodiment of a low cost passive RFID sensor tag with a sensor tag reader such as a cell phone, a personal digital assistant (PDA) or personal computer (PC), allows for sophisticated computational tasks to be carried out on the data collected by a low cost passive RFID sensor tag, for example, solving a complex heat transfer equation to determine the internal temperature of a tagged item when environmental conditions are known and only the surface temperature and contents of a tagged item are known.

The integrated temperature sensor described herein can be integrated by those skilled in the art with wireless platforms compatible with any communication protocol used in wireless radio frequency applications such as, but not limited to, RFID Class-0, Class-0+, Class-1, Gen-2, or other emerging RFID standards, as well as Zigbee, Bluetooth, 802.11, 802.15 and IEEE 1073 standards.

The underlying principles of RFID technology and its applications are described in more detail in: a) International Patent PCT/US05/02171 dated Aug. 11, 2005, entitled "Diagnostic Radio Frequency Identification Sensors and Applications Thereof" and b) United States Patent US 2005/0088299 A1, dated Apr. 28, 2005, entitled "Radio Frequency Identification (RFID) Based Sensor Networks", that are incorporated herein by reference in their entirety.

BRIEF DESCRIPTION OF THE DRAWINGS AND FIGURES

The accompanying drawings and figures which are incorporated herein and form a part of the specification, illustrate the present invention and, together with the description, further serve to explain principles of the invention and enable a person skilled in the pertinent arts to make and use the invention.

FIG. 3($a$) is a full circuit schematic of an illustrative example of a differential integrated analog linear one point calibration temperature sensor.

FIG. 3($b$) is a full circuit schematic of an illustrative example of a low voltage differential integrated analog linear one point calibration temperature sensor with low voltage cascode biasing circuit.

FIGS. 4($a$) and ($b$) shows measurements taken from the circuit of FIG. 3($a$) over the industrial and medical temperature ranges respectively.

FIGS. 5($a$) and ($b$) demonstrate that single point calibrations yield linear functions over the industrial and medical temperature ranges respectively.

FIGS. 6($a$) and ($b$) plot the prediction errors over the industrial and medical temperature ranges respectively.

DETAILED DESCRIPTION OF THE PREFERRED EMBODIMENTS

The following detailed description is organized into individual discussions of the components that comprise the entire system of this invention. There are several possible uses for and applications of this invention, each having different possible configurations.

One of the core aims of this invention is to provide the fundamental resources for low cost, low power wireless sensor platforms, such as integrated temperature sensing and stable voltage and/or current references, which can be used in a variety of sensing applications.

In this discussion, we place particular emphasis on a low power one point calibration analog linear integrated temperature sensor for integration into passive RFID sensor chips, and describe how computationally sophisticated devices like cell phones, PDAs, walkie-talkies, pagers and computers, that read the sensors' data, can be used to perform complex analyses using this data.

The embodiment of the low power analog one point calibration integrated temperature sensor described in detail herein is, however, not limited to passive RFID sensor chips alone, but may be used in any wireless transceiver sensor chip solution.

a) Analog Integrated Linear Temperature Sensor

The first component used for this technology is an ultra-low power linear analog temperature sensor. In this embodiment, we use analog circuit techniques because, when properly designed by those skilled in the art, they consume very little power when on, thereby remaining in thermal equilibrium with their immediate surroundings when powered or un-powered.

Figure 1:
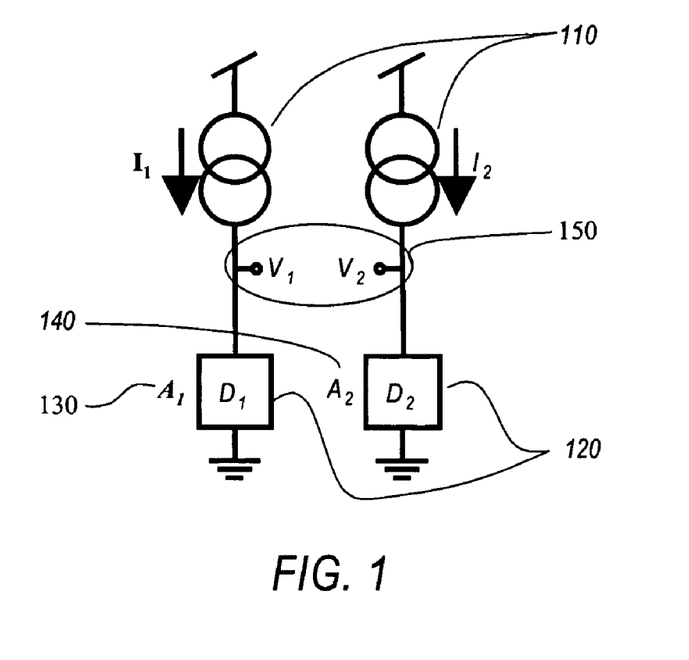
FIG. 1 is an illustrative example of a block diagram of the circuit topology that shows the principal of operation of an analog integrated circuit that senses temperature linearly.

FIG. 1 illustrates the principal of operation of the analog integrated linear temperature sensor. Two constant current sources $I_1$ and $I_2$ (110) feed sensor devices $D_1$ and $D_2$ (120) respectively. Current densities flowing through devices $D_1$ and $D_2$ (120) are designed to be unequal. This can be achieved in many different ways, including but not limited to, different drawn areas $A_1$ and $A_2$ for $D_1$ and $D_2$ respectively or by using a drawn unit area, $A_{unit}=A_1$ (130) for device $D_1$ and $J \cdot A_{unit}=A_2$ (140) for device $D_2$. Voltages $V_1$ and $V_2$ (150) are the outputs of the circuit that are measured in this embodiment.

In this embodiment, sensor $D_i$ exhibits a current-to-voltage relationship of the form $I_i = A_i \exp(kV_i/U_T)$, where $I_i$ is the current through $D_i$, $A_i$ is a parameter defined by the area of $D_i$ and the leakage current of the particular fabrication process, k is a device and process dependent parameter, $V_i$ is the voltage across $D_i$ with respect to ground (GND) and $U_T = kT_k/q$ is the thermal voltage with Boltzmann's constant k, absolute temperature $T_k$(kelvin)=(T(° C.)+273.15), and electronic charge q.

Using the functional form between currents and voltages from [0039], $V_1$ and $V_2$ (150) across sensors $D_1$ and $D_2$ (120) can be written as:

$$V_1 = \frac{U_T}{\kappa} \ln\left(\frac{I_1}{A_1}\right) \text{ and}$$

$$V_2 = \frac{U_T}{\kappa} \ln\left(\frac{I_2}{A_2}\right) \text{ respectively.}$$

The defined output differential voltage ($V_1-V_2$) can then be expressed as:

$$\Delta V \equiv (V_1 - V_2) = \frac{U_T}{\kappa} \ln\left(\frac{I_1 A_2}{I_2 A_1}\right) = T_k\left(\frac{k}{\kappa q}\right)\ln\left(\frac{I_1 A_2}{I_2 A_1}\right).$$

The terms $I_1$, $I_2$, $A_1$ and $A_2$ can be manipulated by those skilled in the art to achieve the preferred multiplicative factor ln $$\left(\frac{I_1 A_2}{I_2 A_1}\right),$$

while maintaining very low power consumption.

Figure 2:
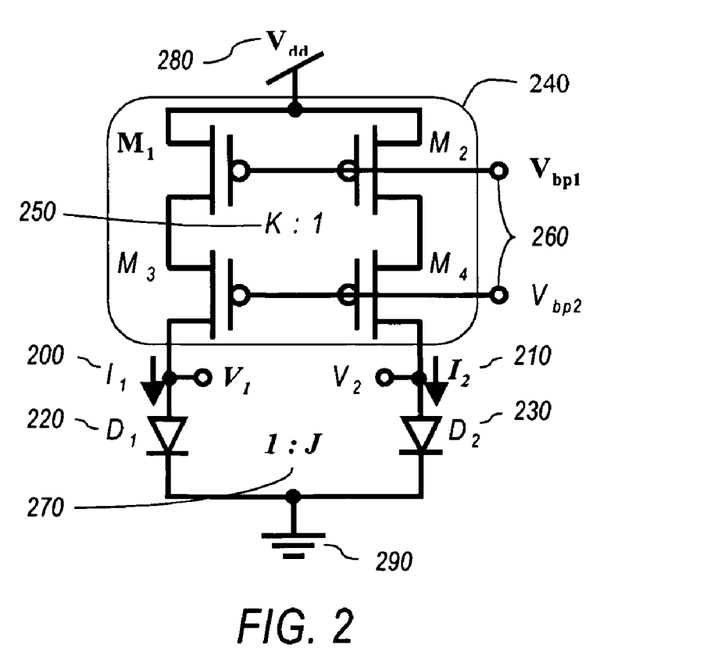
FIG. 2 is a circuit schematic of an illustrative example of a preferred embodiment of an analog integrated differential temperature sensor.

FIG. 2 shows an illustrative example of a possible instantiation of a circuit that delivers currents $I_1$ (200) and $I_2$ (210) to junction diodes $D_1$ (220) and $D_2$ (230). Metal Oxide Silicon (MOS) transistors $M_1$, $M_2$, $M_3$ and $M_4$ are configured as cascoded current source transistors (240) that decrease the output conductance of current sources $I_1$ (200) and $I_2$ (210) and improve the Power Supply Rejection Ratio (PSRR) of the temperature sensor. Transistors $M_1$ and $M_2$ have the same drawn widths ($W_{1,2}$) and lengths ($L_{1,2}$), but transistor $M_1$ may be replicated k times, producing a possible current ratio $I_1 = k \cdot I_2$ (250).

pn junction diodes $D_1$ (220) and $D_2$ (230) are the temperature sensing circuit elements in this embodiment of an analog integrated linear temperature sensor. Alternatively, diode connected MOS or Bipolar Junction Transistors (BJTs) and Schottky diodes could be used in place of the pn junction diodes (220) and (230) depicted in FIG. 2.

The drawn areas of $D_1$ (220) and $D_2$ (230) might be equal, and $D_2$ could be replicated J times to achieve an area ratio of $A_2 = J \cdot A_1$ (270).

Bias voltages $V_{bp1}$ and $V_{bp2}$ (260) are set at appropriate voltages to ensure that $M_1$ and $M_2$ remain in their saturated regions of operation.

A positive power supply $V_{dd}$ (280) is connected to the sources of p-MOS transistors $M_1$ and $M_2$ and supply ground (GND) (290) is connected to the anodes of $D_1$ and $D_2$.

Alternatively, BJTs could be used in place of some or all of the MOS devices.

Using the relationships between currents $I_1$ (200) and $I_2$ (210) in [0043] and areas $A_1$ and $A_2$ in [0045], the relationship between $\Delta V$ and $T_k$ in [0041] can be more simply expressed in terms of K (250) and J (270):

$$\Delta V = T_k\left(\frac{k}{\kappa q}\right)\ln(KJ).$$

By rearranging [0039] and [0049], temperature in degrees Celsius, T(° C.) can be expressed as a linear function of measured differential voltage $\Delta V$ (volt), such that $T = m \cdot \Delta V + c$, with gain m and intercept c;

$$T = \left[\left(\frac{\kappa q}{k}\right)\middle/ \ln(KJ)\right] \cdot \Delta V - 273.15,$$

where:

$$m = \left[\frac{\kappa q}{k} \middle/ \ln(KJ)\right](°C./volt), \text{ and}$$

$$c = -273.15 (°C.).$$

Figure 3A:
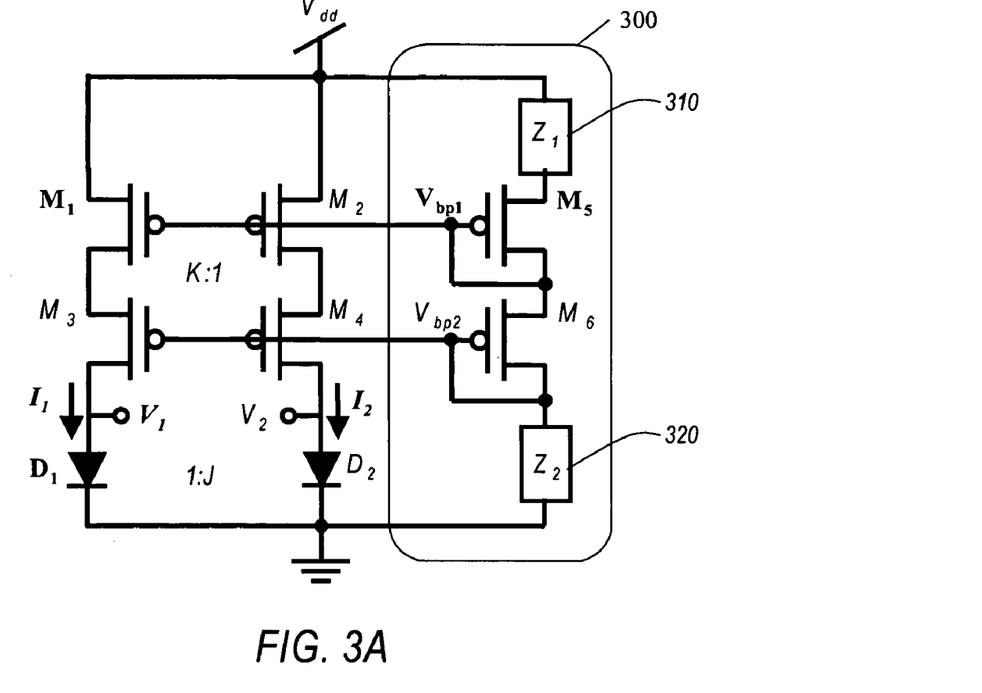

FIG. 3(a) shows the same circuit as in FIG. 2, but with a possible instantiation of a biasing circuit (300) that automatically sets $V_{bp1}$ and $V_{bp2}$ keeping transistors $M_1$ and $M_2$ in saturation. Transistors $M_5$ and $M_6$ are depicted herein as diode connected p-MOS devices. Other circuit device types and circuit topologies may be used to automatically produce bias voltages $V_{bp1}$ and $V_{bp2}$ as is known by those skilled in the art. In this embodiment, it is important that biasing circuitry does not consume a substantial amount of additional power with respect to the sensor circuit itself.

Devices $Z_1$ (310) and $Z_2$ (320) are shown as possible locations for additional circuit components such as diodes, diode connected transistors, zener diodes or resistors, that could be included by those skilled in the art to automatically establish $V_{bp1}$ and $V_{bp2}$ while limiting power consumption and providing for supplementary temperature compensation.

Figure 3B:
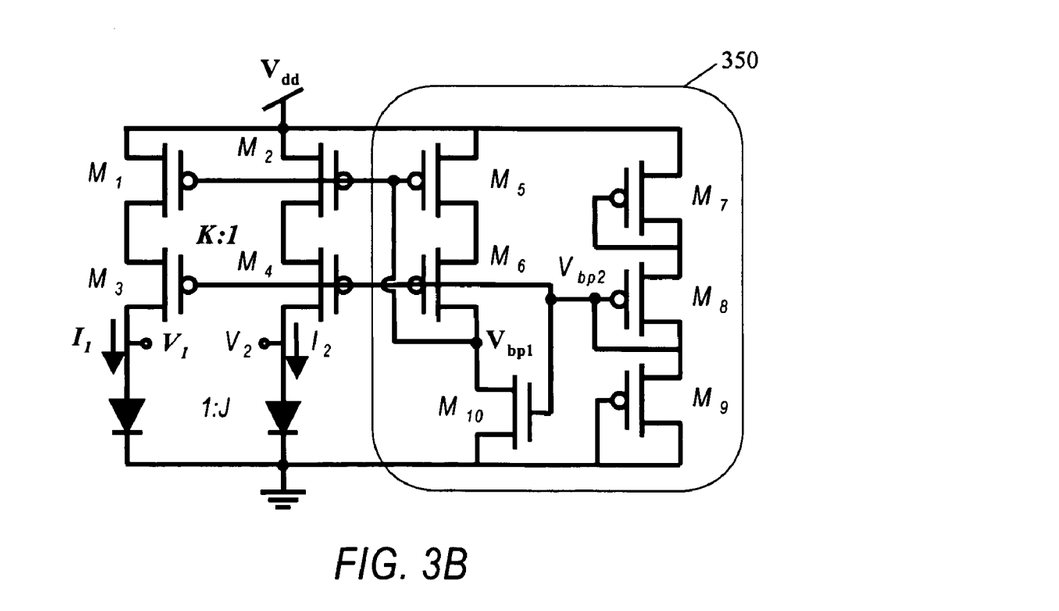

FIG. 3(b) shows a different circuit embodiment of the analog integrated linear temperature sensor that can be used with low voltage circuits ($V_{dd} \approx 1$ volt) that are consistent with state of the art passive RFID chips.

Transistors $M_5$ and $M_6$ are connected in a low voltage cascode configuration with transistor $M_{10}$ providing the necessary current sink. Diode connected p-MOS transistors $M_7$, $M_8$ and $M_9$ set up the correct cascode bias voltage $V_{bp2}$, which when applied to the gate of $M_{10}$, sets up the bias voltage $V_{bp1}$ that establishes the currents $I_1$ and $I_2$.

Figure 4A:
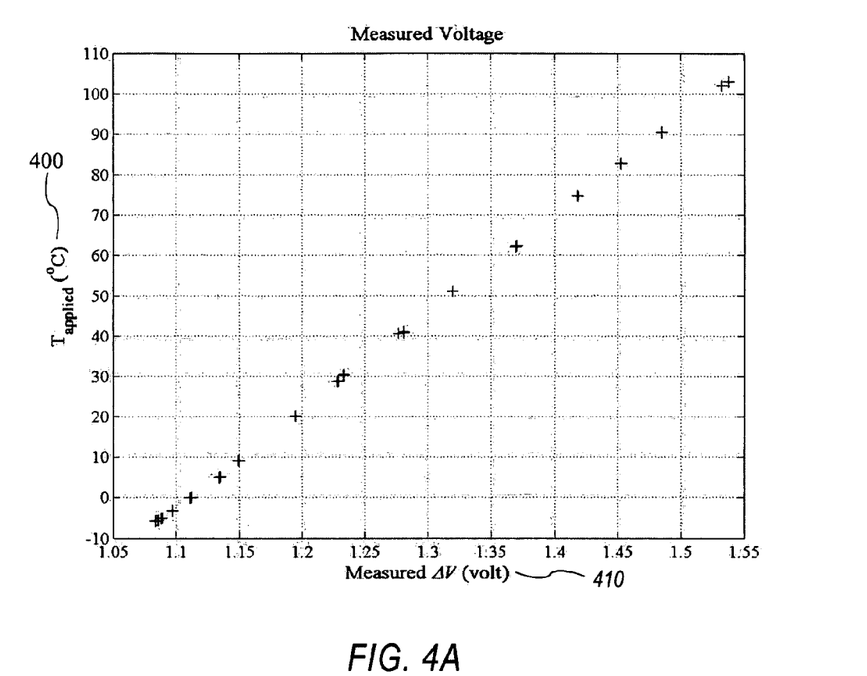
Figure 4B:
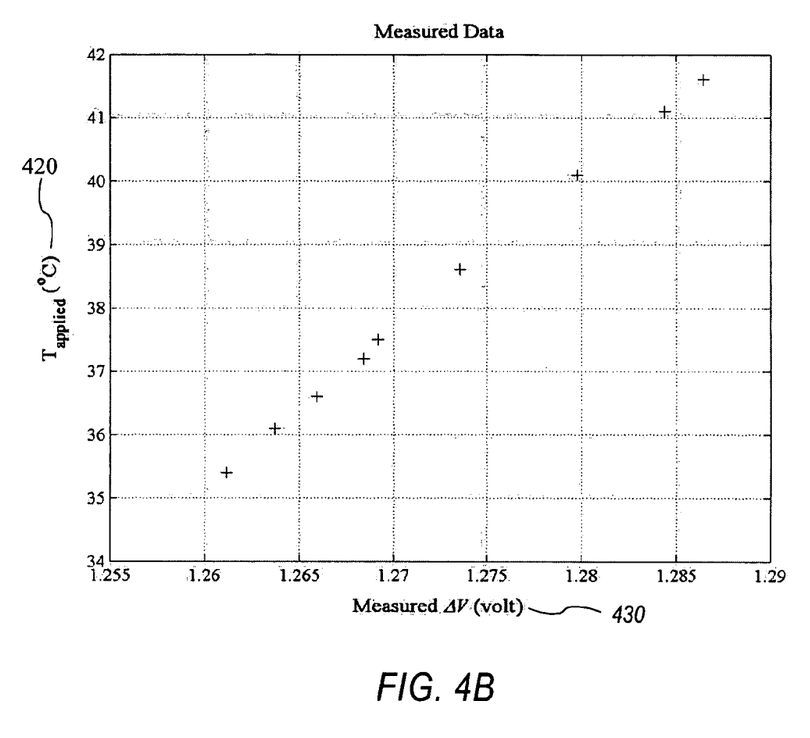

FIG. 4 is a plot of measurements ($T_{applied}$, $\Delta V$) taken from the analog integrated temperature sensor of FIG. 3(a) that was fabricated in a 0.35 μm digital CMOS process. The circuit of FIG. 3(a) was supplied with $V_{dd}$=3V from a battery and mounted inside a solid cylindrical block of aluminum. An independent measure of the circuit's temperature, $T_{applied}$ was made using a calibrated thermistor. The two analog output voltages $V_1$ and $V_2$ were measured using two differential (with respect to GND) analog input channels of a 16 bit data acquisition card (PC-CARD-DAS16/16-AO), with each analog input channel set to have a full scale range of ±2.5V. Temperatures, $T_{applied}$ (° C.) and voltages $V_1$ and $V_2$ were measured periodically, and the resulting $\Delta V$ (volt)=($V_1$-$V_2$) calculated.

FIG. 4(a) plots $T_{applied} \approx -6°$ C. to 110° C. (400) versus measured output differential voltage, $\Delta V$ (410) over most of $T_{industrial}$. The data strongly suggest a linear relationship between $\Delta V$, and $T_{applied}$ over most of $T_{industrial}$. FIG. 4(b) plots $T_{applied} \approx 34°$ C. to 42° C.) (420), namely $T_{medical}$. This data suggest the same linear relationship between $\Delta V$ (430), and $T_{applied}$.

b) One Point Calibration

A novel feature of this embodiment of a low power analog linear integrated temperature sensor is that it can be calibrated at a single chosen temperature point, $T_{calibration}$. This feature reduces the cost of manufacture of an RFID sensor, makes it simple to calibrate and the calibration parameter m, (see [0050]), can be stored on the RFID sensor chip itself or in a database that contains the chip's unique identification number.

m can be calculated from knowledge of $T_{calibration}$ and the measured voltages $V_1$ and $V_2$ as follows:

$$m=(T_{calibration}+273.15)/(V_1-V_2).$$

Figure 5A:
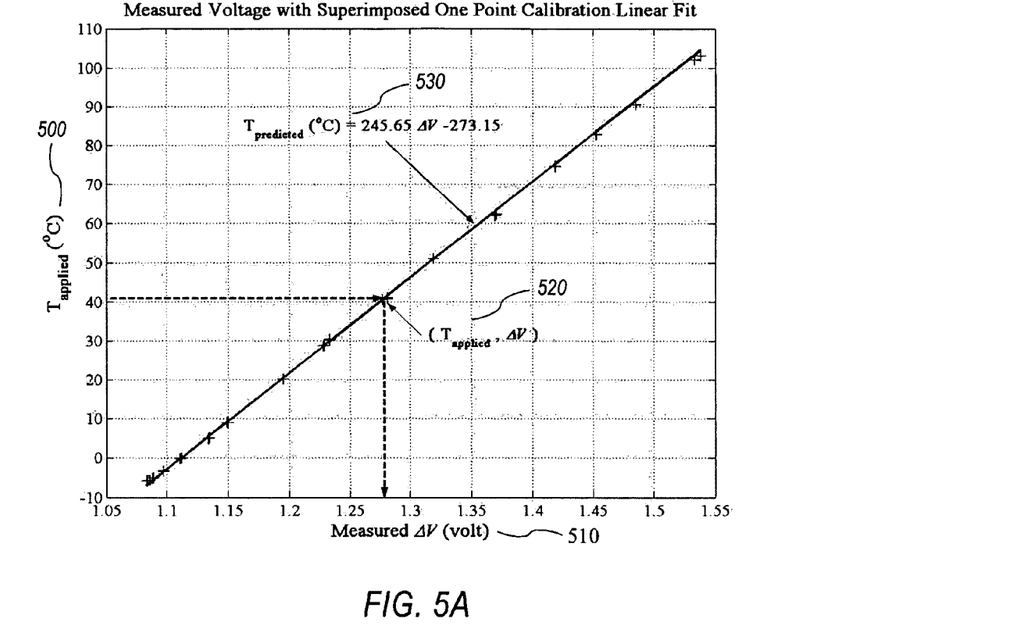
Figure 5B:
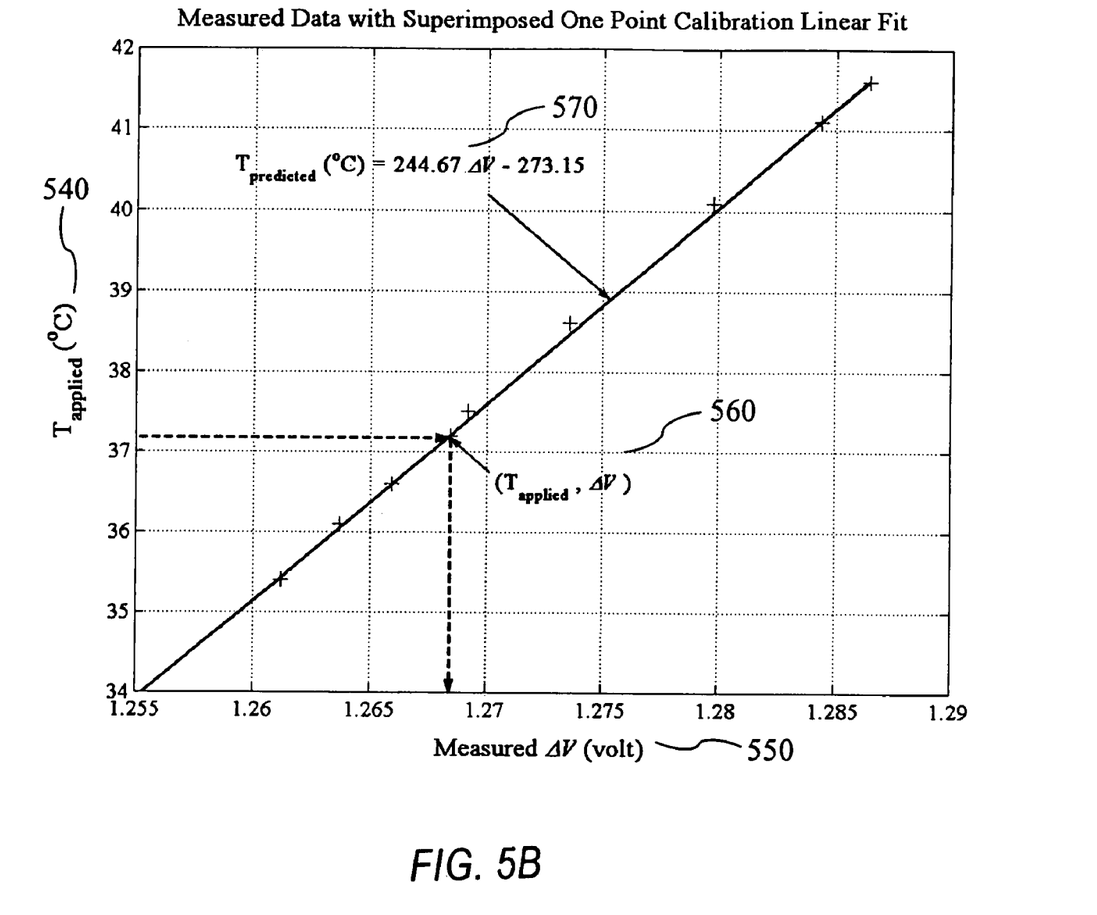

FIG. 5(a) and FIG. 5(b) plot actual measurements taken from the analog integrated temperature sensor of FIG. 3(a), fabricated in a 0.35 μm digital CMOS process (and plotted in FIGS. 4(a) and (b)) along with a linear fit, $T_{predicted}$(° C.)=M$\Delta V$−273.15 as determined by the one point calibration.

FIG. 5(a) plots $T_{applied}$ (500) versus measured $\Delta V$ (510) which demonstrates that a single point calibration ($T_{applied}$, $\Delta V$) (520) performed on the data of FIG. 4(a) at 42° C., yields the linear functional relationship $T_{predicted}$(° C.)=245.65$\Delta V$−273.15(530). Similarly, FIG. 5(b) plots $T_{applied}$ (540) versus measured $\Delta V$ (550) demonstrates that for $T_{medical}$, a single point calibration ($T_{applied}$, $\Delta V$) (560) performed on the data of FIG. 4(b) at 37.2° C., yields the linear functional relationship $T_{predicted}$(° C.)=244.67$\Delta V$−273.15 (570).

Figure 6A:
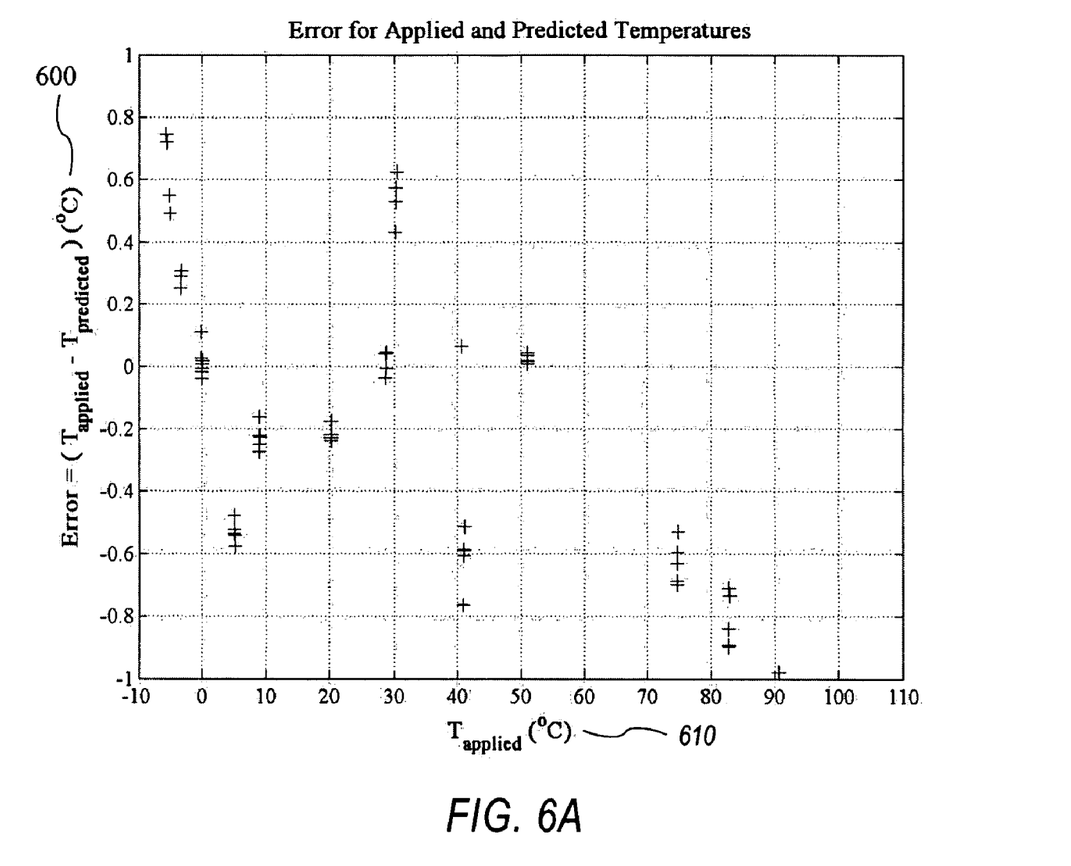
Figure 6B:
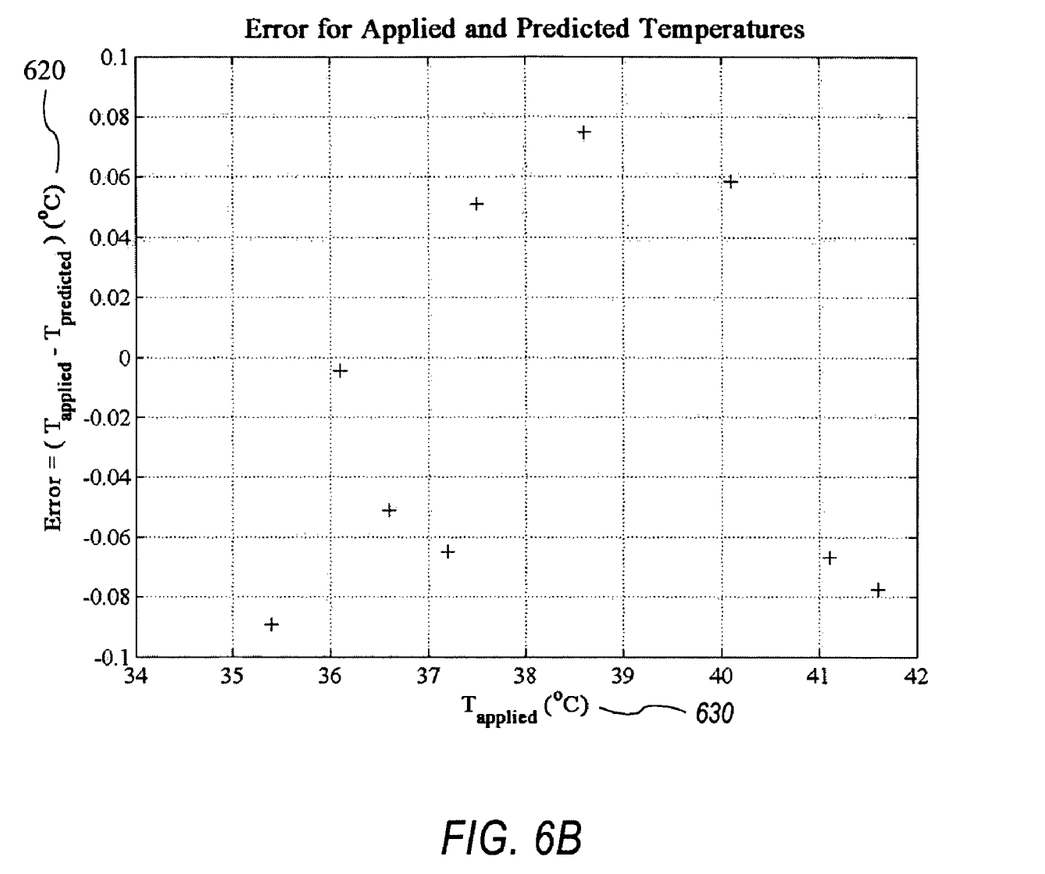

FIG. 6(a) and FIG. 6(b) plot the errors, ($T_{applied}$−$T_{predicted}$) (° C.) (600) between the linear functional relationships illustrated in FIGS. 5(a) and (b) against $T_{applied}$ (610). FIG. 6(a) shows that over $T_{industrial}$, the expected value of the error in prediction lies between +1° C. and −1° C. Similarly, FIG. 6(b) shows that over $T_{applied}$=$T_{medical}$ (630), the error in prediction (620) lies between +0.1° C. and −0.1° C.

These prediction errors lie well within the accepted bounds for most commercial, industrial and medical diagnostic applications. The chosen $T_{calibration}$ determines the accuracy of $T_{predicted}$. An accuracy of ±0.1° C. can be expected within ~10° C. on either side of $T_{calibration}$, and deteriorates slowly as $T_{applied}$ moves further away from $T_{calibration}$ in either direction. Therefore this technology can also be applied to medical applications, where high accuracy is required.

In another embodiment, added accuracy (reduced prediction error) could be obtained by applying a constrained linear regression, with m to be fitted and c=−273.15° C., to data collected over the industrial or medical temperature ranges as necessary for the particular application.

In still another embodiment, additional accuracy (reduced prediction error) could be obtained by applying an unconstrained linear regression, with m and c to be fitted to data collected over the industrial or medical temperature ranges as necessary for the particular application.

c) Stable References for On- and Off-Chip Wireless Sensors

As indicated in [0034], low power wireless sensors, such as the linear analog one point calibration integrated temperature sensor, and stable, temperature independent voltage and/or current references, provide the fundamental resources for low cost, low power wireless sensor platforms, that can be used in a variety of sensing applications.

Figure 7:
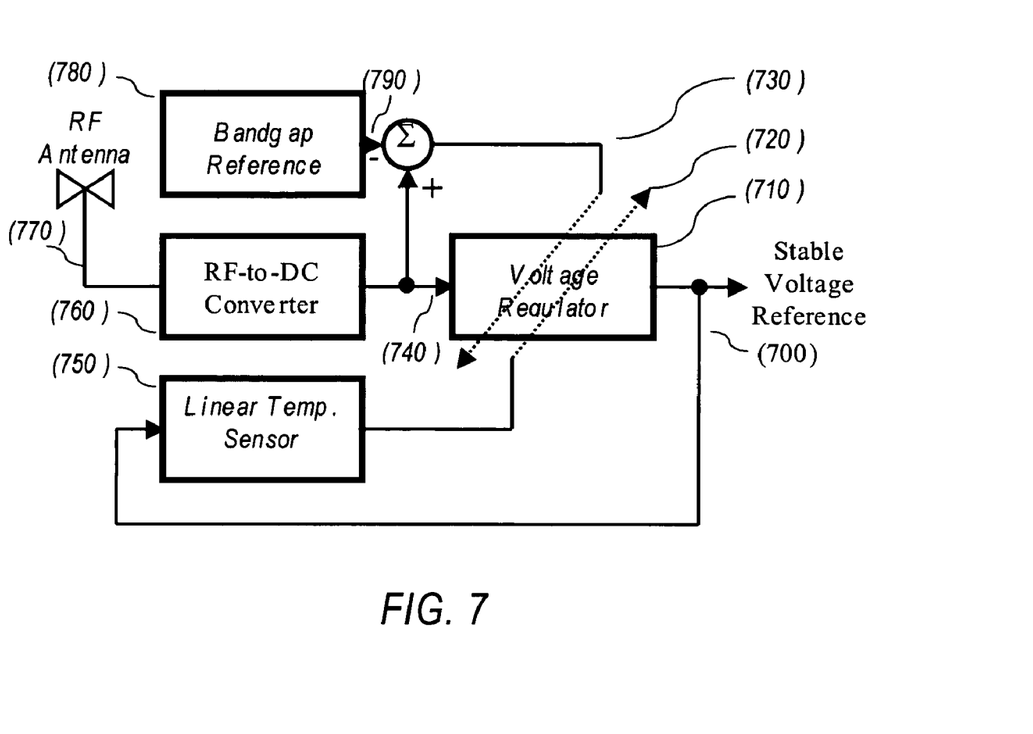
FIG. 7 is an illustrative example of a temperature independent, stable voltage source.

FIG. 7 is an illustrative example of a block diagram of an integrated ultra-stable voltage reference (700), working in tandem with the above described technology.

In this embodiment, a Voltage Regulator (710) uses two feedback voltage signals, (720) and (730) to automatically adjust its input voltage (740) so that its output voltage (700) remains fixed over $T_{industrial}$. The low power analog linear one point calibration integrated temperature sensor (750), an embodiment of which is illustrated in FIG. 3(a) or (b), supplies a feedback voltage signal with linear temperature dependence (720) to the voltage regulator (710). The RF Antenna (770) collects and supplies an alternating current (ac) voltage signal to the RF-to-DC converter (760) which rectifies and filters the signal to produce a direct current (dc) output voltage (740). It is this output that is commonly used as the supply voltage ($V_{dd}$) for RF transceiver circuitry. The output voltage (790) of a Bandgap Voltage Reference (780) is subtracted from the dc output voltage (740) to produce an error voltage signal (730) to the Voltage Regulator (710).

In another embodiment, the signals (700), (720), (730), (740) and (790) can be represented by currents, as is known by those skilled in the art. As such, signal (700) would correspond to a Stable Current Reference.

Stable voltage and/or current references with ADCs can be used for on-chip devices such as an integrated pressure sensor. In addition, these references with temperature independent constant voltages or currents can be used for a variety of off-chip sensors such as diagnostic sensors, printable polymer sensors, pressure sensors, and stress and strain sensors. Further applications are described in International Patent PCT/US05/02171 dated Aug. 11, 2005, entitled "Diagnostic Radio Frequency Identification Sensors and Applications Thereof".

Supplying a constant current to a sensor, and measuring the resulting change in voltage across that sensor due to a physical change in the sensed variable, is a commonly used measurement technique known as "source measurement". Conversely, supplying a fixed voltage across a sensor and measuring the change in current is also referred to as "source measurement".

Most sensors, such as strain gauges, humidity, pressure and other sensors, used in conjunction with source measurements are themselves temperature dependent. It is essential that the temperature of the sensor at the time of measurement be known in order to ensure accuracy.

d) Differential Sampling

Another novel embodiment of this invention is the combination of a low cost passive RFID sensor tag and an RFID reader with a sensor that measures the same variables as the tag. Defined as "dual use" differential measurement, this technique allows for increased sensor tag accuracy as well as the ability to perform sophisticated computations.

Increased accuracy is obtained by mitigating the effects of the environment using the two temperatures measured by the passive RFID sensor tag and by the reader's sensor.

Complex analysis such as solving a heat transfer equation to determine the internal temperature of a tagged item when environmental conditions are measured and only the surface temperature and contents of the tagged item are known.

Figure 8:
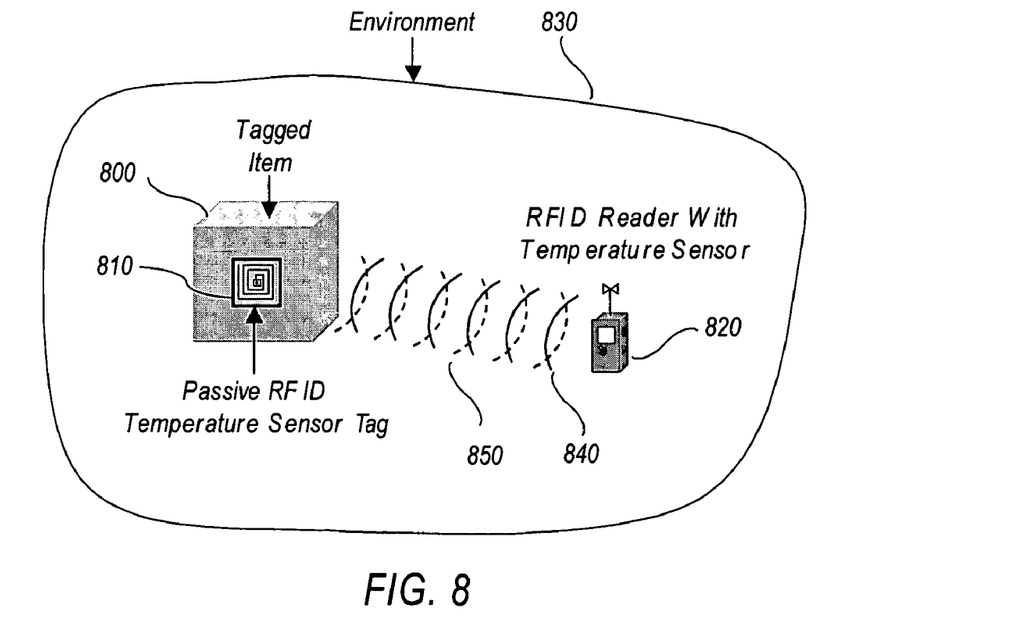
FIG. 8 is an illustrative example of dual use of a passive RFID temperature tag and a temperature sensor equipped RFID reader that uses the difference in temperatures to improve accuracy and perform complex computations.

FIG. 8 is an illustrative example of dual use differential measurement. A tagged item (800) and an RFID reader (820) are placed in the same environment (830). The item (800) has a passive RFID sensor tag (810) attached to its surface. An RFID reader such as, but not limited to a cell phone, PDA, PC, walkie-talkie or pager equipped with a temperature sensor (820) initiates an on-demand reading (840) of the tagged item (800) and, at the same time measures the temperature of the common environment (830). The passive RFID temperature tag (810) rebroadcasts (850) its identity and temperature data back to the reader (820). The reader (820) now has all the data pertaining to the temperature of the common environment (830) as well as the surface temperature and identity of the tagged item (800). Any number of sophisticated computations using this time-synchronized temperature data combined with historical data collected and saved at other relevant times, can now be carried out by the RFID reader itself (820), or transmitted over cellular networks to servers that can perform complex computations using the collected data as described in United States Patent US 2005/0088299 A1, dated Apr. 28, 2005, entitled "Radio Frequency Identification (RFID) Based Sensor Networks".

The invention described herein introduces a novel one point calibration, low power, low cost, analog integrated linear temperature sensor that can also be used for stable voltage and current references that are essential for wireless sensor platforms. There are many applications where sensors require stable voltage and current references and the physics of the sensor's transduction mechanisms are themselves temperature dependent. Wireless platforms such as, but not limited to, passive RFID tags with the addition of on- or off-chip sensors provide a low cost solution for a variety of low cost sensor applications.

By combining this sensor technology with networked wireless devices, such as cell phones, a new low cost wireless platform solution is created for consumer, industrial and diagnostic applications.

Other embodiments of the invention will be apparent to those skilled in the art from consideration of the specification and practice of the invention disclosed herein. It is intended that the specification, drawings and examples be considered as exemplary only, with the true scope and spirit of the invention being indicated by the following claims. It should be understood that the embodiments shown and described and all changes and modifications that come within the spirit of the invention are desired to be protected.

What is claimed is:

1. An analog linear temperature sensor which provides an output, said sensor comprising:
    integrated temperature sensing elements configured to produce zero differential voltage at absolute zero temperature, wherein only a single measurement at a non-zero absolute temperature is required to calibrate the output over a range of temperatures;
    said sensor being integrated into a computational device and configured to measure environmental temperature; and
    said computational device being a cellular telephone, wherein said cellular telephone is configured to read temperature data from said sensor and data from at least one other sensor integrated into a radio frequency identifier (RFID) tag wherein said tag includes a wireless transceiver, said tag being attached to an object.

2. An analog linear temperature sensor which provides an output, said sensor comprising:
    integrated temperature sensing elements configured to produce zero differential voltage at absolute zero temperature, wherein only a single measurement at a non-zero absolute temperature is required to calibrate the output over a range of temperatures;
    said sensor being integrated into a computational device and configured to measure environmental temperature;
    said computational device being a cellular telephone, wherein said cellular telephone is configured to read temperature data from said sensor and data from at least one other sensor integrated into a radio frequency identifier (RFID) tag wherein said tag includes a wireless transceiver, said tag being attached to an object; and
    wherein said tag is configured as a passive diagnostic temperature skin patch sensor.

* * * * *